US011683255B2

(12) United States Patent
Yoshida et al.

(10) Patent No.: US 11,683,255 B2
(45) Date of Patent: Jun. 20, 2023

(54) APPARATUS AND METHOD FOR CAPTURING PACKETS BEFORE AND AFTER NETWORK COMMUNICATION FAILURE

(71) Applicant: Nippon Telegraph and Telephone Corporation, Tokyo (JP)

(72) Inventors: Shuhei Yoshida, Tokyo (JP); Yuta Ukon, Tokyo (JP); Shoko Oteru, Tokyo (JP); Namiko Ikeda, Tokyo (JP); Koyo Nitta, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/604,943

(22) PCT Filed: May 14, 2019

(86) PCT No.: PCT/JP2019/019123
§ 371 (c)(1),
(2) Date: Oct. 19, 2021

(87) PCT Pub. No.: WO2020/230265
PCT Pub. Date: Nov. 19, 2020

(65) Prior Publication Data
US 2022/0217069 A1    Jul. 7, 2022

(51) Int. Cl.
*H04L 43/12* (2022.01)
*H04L 43/0811* (2022.01)
(Continued)

(52) U.S. Cl.
CPC .......... *H04L 43/12* (2013.01); *H04L 43/0811* (2013.01); *H04L 43/0829* (2013.01); *H04L 43/0847* (2013.01); *H04L 43/0882* (2013.01)

(58) Field of Classification Search
CPC ............. H04L 43/0811; H04L 43/0829; H04L 43/0847; H04L 43/0882; H04L 43/12
(Continued)

(56) References Cited

U.S. PATENT DOCUMENTS

| 6,965,725 | B1 * | 11/2005 | Ichikawa | ............... | H04N 5/783 |
| | | | | | 386/E9.052 |
| 2002/0169900 | A1 * | 11/2002 | Hiji | ......................... | G06F 13/28 |
| | | | | | 710/22 |

(Continued)

FOREIGN PATENT DOCUMENTS

| JP | 200387356 A | 3/2003 |
| JP | 200488289 A | 3/2004 |

OTHER PUBLICATIONS

Chen et al., Catching the Microburst Culprits with Snappy, Proceedings of the Afternoon Workshop on Self-Driving Networks, pp. 22-28 (2018) (Year: 2018).*
(Continued)

*Primary Examiner* — David P Zarka
(74) *Attorney, Agent, or Firm* — Slater Matsil, LLP

(57) ABSTRACT

An embodiment packet capture device comprises: a packet receiver configured to receive a packet from a network; a packet retainer configured to store the received packet in a memory to temporarily retain the received packet; a failure detector configured to determine a communication failure is present in the network; a capture controller configured to determine an operation stop address such that retention of packets from the network in time periods before and after a detection time point of the communication failure is ensured when the communication failure is detected by the failure detector; and a capture data generator configured to output the packet stored in the memory as capture data when a storage destination address of the packet stored in the memory has reached the operation stop address or when at
(Continued)

least a predetermined waiting time period has elapsed from the detection time point of the communication failure.

12 Claims, 10 Drawing Sheets

(51) Int. Cl.
 *H04L 43/0829* (2022.01)
 *H04L 43/0823* (2022.01)
 *H04L 43/0882* (2022.01)
(58) Field of Classification Search
 USPC .......................................................... 709/224
 See application file for complete search history.

(56) References Cited

U.S. PATENT DOCUMENTS

| | | | | |
|---|---|---|---|---|
| 2009/0086735 A1* | 4/2009 | Tsang | .................... | H04L 1/1874 370/394 |
| 2017/0070363 A1* | 3/2017 | Watkins | .................. | G06F 13/00 |
| 2017/0295583 A1* | 10/2017 | Kariya | ................ | H04W 72/085 |
| 2018/0145906 A1* | 5/2018 | Yadav | ..................... | H04L 45/70 |
| 2019/0334792 A1* | 10/2019 | Ayandeh | ............. | H04L 43/0876 |
| 2020/0328976 A1* | 10/2020 | Koral | .................... | H04L 43/062 |

OTHER PUBLICATIONS

Joshi et al., BurstRadar: Practical Real-time Microburst Monitoring for Datacenter Networks, Proceedings of the 9th Asia-Pacific Workshop on Systems, pp. 1-8, 2018 (Year: 2018).*
Shan et al., Micro-burst in Data Centers: Observations, Analysis, and Mitigations, 2018 IEEE 26th International Conference on Network Protocols, pp. 88-98, 2018 (Year: 2018).*
Yoshida et al., FPGA-based network microburst analysis system with efficient packet capturing, Journal of Optical Communications and Networking, pp. 72-80, Jun. 2021 (Year: 2021).*
Nakamura, Yutaka et al., "Automatic preservation of unusual traffic which combined intrusion detection and a monitoring system," IPSJ SIG Technical Report, vol. 2011-IOT-12, No. 38, Mar. 1, 2011, 7 pages.
"100GbE S2D full-rate packet capture / analysis device Synesis (registered trademark)", Toyo Corporation, Internet <http://www.kyoei-ele.com/products/index.php/prod/info/299/file/7.pdf>, 9 pages.

* cited by examiner

| ADDRESS | DATA |
|---|---|
| 0x0000 | PACKET A |
| 0x0001 | PACKET B |
| 0x0002 | PACKET C |
| ⋮ |  |
| 0xXXXX | PACKET X |
| 0xYYYY | PACKET Y |
| 0xZZZZ | PACKET Z |

| FLOW ID | SOURCE MAC ADDRESS | DESTINATION MAC ADDRESS | SOURCE IP ADDRESS | DESTINATION IP ADDRESS | ... |
|---|---|---|---|---|---|
| FLOW #0 | XX-XX-XX-XX-XX-XX | YY-YY-YY-YY-YY-YY | 192.168.1.100 | 192.168.1.200 | |
| FLOW #1 | YY-YY-YY-YY-YY-YY | ZZ-ZZ-ZZ-ZZ-ZZ-ZZ | 192.168.1.101 | 192.168.1.201 | |
| : | : | : | : | : | |
| FLOW #N | ZZ-ZZ-ZZ-ZZ-ZZ-ZZ | XX-XX-XX-XX-XX-XX | 192.168.1.105 | 192.168.1.205 | |

Fig. 11

| | | CUMULATIVE NUMBER OF PACKETS | CUMULATIVE NUMBER OF BYTES |
|---|---|---|---|
| ENTIRE TRAFFIC | | 1000 | 100,000 |
| FLOW-BY-FLOW BASIS | FLOW #0 | 100 | 10,000 |
| | FLOW #1 | 200 | 20,000 |
| | : | | |
| | FLOW #N | 300 | 30,000 |

APPARATUS AND METHOD FOR CAPTURING PACKETS BEFORE AND AFTER NETWORK COMMUNICATION FAILURE

CROSS-REFERENCE TO RELATED APPLICATION

This application is a national phase entry of PCT Application No. PCT/JP2019/019123, filed on May 14, 2019, which application is hereby incorporated herein by reference.

TECHNICAL FIELD

The present invention relates to a packet capture device and a packet capture method for collecting packets in time periods before and after the occurrence of communication failure in a network.

BACKGROUND

In an Internet Protocol (IP) network such as a network in a data center or a network for providing cloud services, when communication failure such as packet loss or burst traffic occurs, a reduction in service quality is caused. To cope with this, in the IP network, it is important to identify a cause of the failure occurrence and perform recovery from the failure quickly.

A common network failure analysis method includes a method in which packets flowing in a network having communication failure are captured by using a capture device and retained, and field information of a header of data of each retained packet is examined by using an analysis tool such as Wireshark, whereby traffic of a flow which causes the communication failure is identified. Herein, the flow denotes a group of packets defined by a combination of the field information of the packet header such as a source IP address and a destination IP address.

In the case where the above failure analysis method is performed with manpower, it is common to perform a procedure in which, after the occurrence of the communication failure in the network is confirmed by some means, the traffic in the network having the communication failure is captured by using the capture device and is retained for a predetermined time period, and it is determined whether or not a failure occurrence part is included in retained data. In this procedure, the step of determining whether or not the failure occurrence part is included in the retained data takes time. In addition, in the case of communication failure having low reproducibility, the traffic at the time of the failure occurrence is not necessarily included in the retained data, and the above procedure may need to be repeated a plurality of times, and hence the failure analysis may take an additional amount of time.

There is proposed a technique intended to solve such a problem of the conventional failure analysis method (see NPL 1 and 2). For example, NPL 1 proposes a method for implementing automatic preservation of unusual traffic by combining an intrusion detection system and a traffic monitoring system. In addition, NPL 2 describes a packet capture product which uses Simple Network Management Protocol (SNMP) trap reception as a trigger, and has a function of capturing packets in predetermined time periods before and after the trigger and retaining the packets.

In each of the methods disclosed in NPL 1 and 2, when the communication failure in the network is detected, the packet retention is automatically started, and hence it is not necessary to capture and retain packets again after the communication failure is detected. Consequently, it is possible to solve the problem in which the retention of the packet needs to be repeated a plurality of times in the case where the analysis of the above-described communication failure having low reproducibility is performed, which prevents an increase in the efficiency of the analysis.

In addition, in each of the methods disclosed in NPL 1 and 2, it is possible to capture and retain packets in the time periods before and after a timing at which notification via the network such as the SNMP trap is received. Specifically, in each of the methods disclosed in NPL 1 and 2, the capture of the packet is started before the communication failure in the network is detected, and captured packet data is output as a file in a packet capture (PCAP) format whenever necessary. Subsequently, when the SNMP trap is received, overwriting of the file in the PCAP format in which the packet data in the time periods (time periods of, e.g. several minutes) before and after failure detection time is recorded is prohibited. With the operation described above, in each of the methods disclosed in NPL 1 and 2, the packets in the time periods before and after the timing at which the SNMP trap is received are retained.

However, in the SNMP which makes a notification via the network, a delay may occur in a time period from an actual failure occurrence timing to the reception of the SNMP trap. Accordingly, it is necessary to secure an extra capacity of a buffer which retains the packets in consideration of a delay time period. In the case where a network having a high frequency band such as the network in the data center is a monitoring target, even when the delay time period is only several seconds, the extra capacity of the buffer which has to be secured is enormous.

In addition, as in NPL 2, in the case where the captured packet data is output as the file whenever necessary, it is necessary to secure the sufficient capacity of a storage such as a Hard Disk Drive (HDD) or a Solid State Drive (SSD). For example, in the case where communication failure having an extremely short failure occurrence time period such as micro burst traffic (data which sharply increases with a time range on a microsecond order) is detected and the packet is captured, the ratio of the packet data including the failure occurrence time period required for the analysis in the packet data output as the file is extremely small, and the use efficiency of the storage capacity becomes extremely low.

As countermeasures to avoid an increase in the capacity of the storage, it is conceivable to reduce the delay time period in a time period from a failure detection timing to a packet capture start timing by allowing the detection of the failure on a capture device side by providing a failure detection function and a capture function in the same capture device.

However, in the case where, similarly to the device disclosed in NPL 2, the method in which the packets in the time periods before and after the failure detection are retained by starting the capture of the packets before the communication failure is detected and continuously performing the capture of the packets in a predetermined time period after the failure detection is implemented with a memory-saving configuration, the following problem arises. That is, in the case where the memory-saving configuration is used, as in the burst traffic, when an input rate is temporarily increased, there is a possibility that a buffer memory is fully occupied by the packet data after the failure detection, and the packets before the failure detection cannot be captured.

CITATION LIST

Non Patent Literature

NPL 1: Yutaka Nakamura et al., "Automatic preservation of unusual traffic which combined intrusion detection and a monitoring system", IPSJ SIG Technical Report, Vol. 2011-IOT-12, No. 38, 1 Mar. 2011
NPL 2: "100GbE S2D full-rate packet capture/analysis device Synesis (registered trademark)", Toyo Corporation, Internet

SUMMARY

Technical Problem

Embodiments of the present invention have been achieved in order to solve the above problem, and an object thereof is to provide a packet capture device and a packet capture method capable of ensuring collection of packets in time periods before and after failure occurrence with a minimum memory configuration.

Means for Solving the Problem

A packet capture device embodiment of the present invention includes: a packet reception section configured to receive a packet from a network; a packet retention section configured to store the received packet in a memory to temporarily retain the received packet; a failure detection section configured to determine whether or not communication failure is present in the network based on information of the received packet; a capture control section configured to determine an operation stop address such that retention of packets in time periods before and after a detection time point of the communication failure is ensured when the communication failure is detected by the failure detection section; and a capture data generation section configured to output the packet stored in the memory as capture data when a storage destination address of the packet of the memory has reached the operation stop address or when a predetermined waiting time period or more has elapsed from the detection time point of the communication failure.

In addition, in a configuration example of the packet capture device embodiment of the present invention, the packet retention section has the memory having a ring buffer configuration, and stores the packet received by the packet reception section in an area of the storage destination address of the memory and updates the storage destination address in a case where the communication failure is not yet detected or in a case where the storage destination address does not reach the operation stop address and an elapsed time period from the detection time point of the communication failure is less than the waiting time period when the packet is received by the packet reception section.

Further, in a configuration example of the packet capture device embodiment of the present invention, the capture control section determines the operation stop address based on the storage destination address at the detection time point of the communication failure and a length of a preset ensuring time period in which retention of the packet before detection of the communication failure is ensured.

In addition, in a configuration example of the packet capture device embodiment of the present invention, the failure detection section determines that the communication failure is present in the network in a case where the cumulative number of packets of the packet received by the packet reception section per predetermined time interval is more than a cumulative packet number upper limit threshold value, or in a case where the cumulative number of bytes of the packet received by the packet reception section per predetermined time interval is more than a cumulative byte number upper limit threshold value.

Further, a configuration example of the packet capture device embodiment of the present invention further includes: a flow identification section configured to identify a flow to which the packet received by the packet reception section belongs; and a cumulative information retention section configured to retain the cumulative number of packets of the packet received by the packet reception section and the cumulative number of bytes of the packet received by the packet reception section for each flow, and the failure detection section determines that the communication failure is present in the network in a case where the cumulative number of packets of each flow per predetermined time interval is more than a cumulative packet number upper limit threshold value, or in a case where the cumulative number of bytes of each flow per predetermined time interval is more than a cumulative byte number upper limit threshold value.

In addition, in a configuration example of the packet capture device embodiment of the present invention, the capture data generation section uses the operation stop address as a start address, and outputs the packet stored in an area of the memory to an address obtained by subtracting 1 from the storage destination address as the capture data.

Further, a configuration example of the packet capture device embodiment of the present invention further includes a parameter setting section configured to be able to set the waiting time period.

In addition, a packet capture method embodiment of the present invention includes: a first step of receiving a packet from a network; a second step of determining whether or not communication failure is present in the network based on information of the received packet; a third step of determining an operation stop address such that retention of packets in time periods before and after a detection time point of the communication failure is ensured when the communication failure is detected in the second step; a fourth step of storing the packet received in the first step in a memory to temporarily retain the received packet; and a fifth step of outputting the packet stored in the memory as capture data when a storage destination address of the packet of the memory has reached the operation stop address or when a predetermined waiting time period or more has elapsed from the detection time point of the communication failure.

Effects of the Invention

According to embodiments of the present invention, it becomes possible to ensure the collection of the packets in the time periods before and after the failure occurrence with a memory-saving system configuration by determining the operation stop address such that the retention of the packets in the time periods before and after the detection time point of the communication failure is ensured when the communication failure in the network is detected, and outputting the packet stored in the memory as the capture data when the storage destination address of the packet of the memory has reached the operation stop address or when the predetermined waiting time period or more has elapsed from the detection time point of the communication failure.

BRIEF DESCRIPTION OF DRAWINGS

FIG. 10 is a view showing the detail of flow information retained in a flow information retention section of the packet capture device according to the second embodiment of the present invention.

FIG. 11 is a view showing the detail of cumulative information retained in a cumulative information retention section of the packet capture device according to the second embodiment of the present invention.

DESCRIPTION OF EMBODIMENTS

Outline

Figure 1:
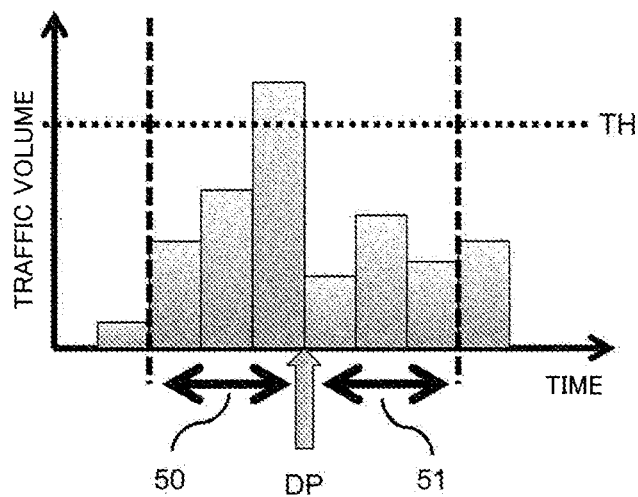
FIG. 1 is a view for explaining an outline of an operation of a packet capture device embodiment of the present invention.

FIG. 1 is a view for explaining an outline of an operation of a packet capture device embodiment of the present invention. In the packet capture device embodiment of the present invention, it is determined that communication failure has occurred in a network when a traffic volume exceeds a threshold value TH. DP in FIG. 1 denotes a detection time point of the communication failure. In addition, 50 in FIG. 1 denotes, among time periods before the detection time point DP of the communication failure, a time period in which retention of a packet is ensured. Further, 51 denotes, among time periods after the detection time point DP, a time period in which the retention of the packet is ensured. Among the time periods after the detection time point DP, the maximum time period in which the retention of the packet is ensured is a seconds.

First Embodiment

Figure 2:
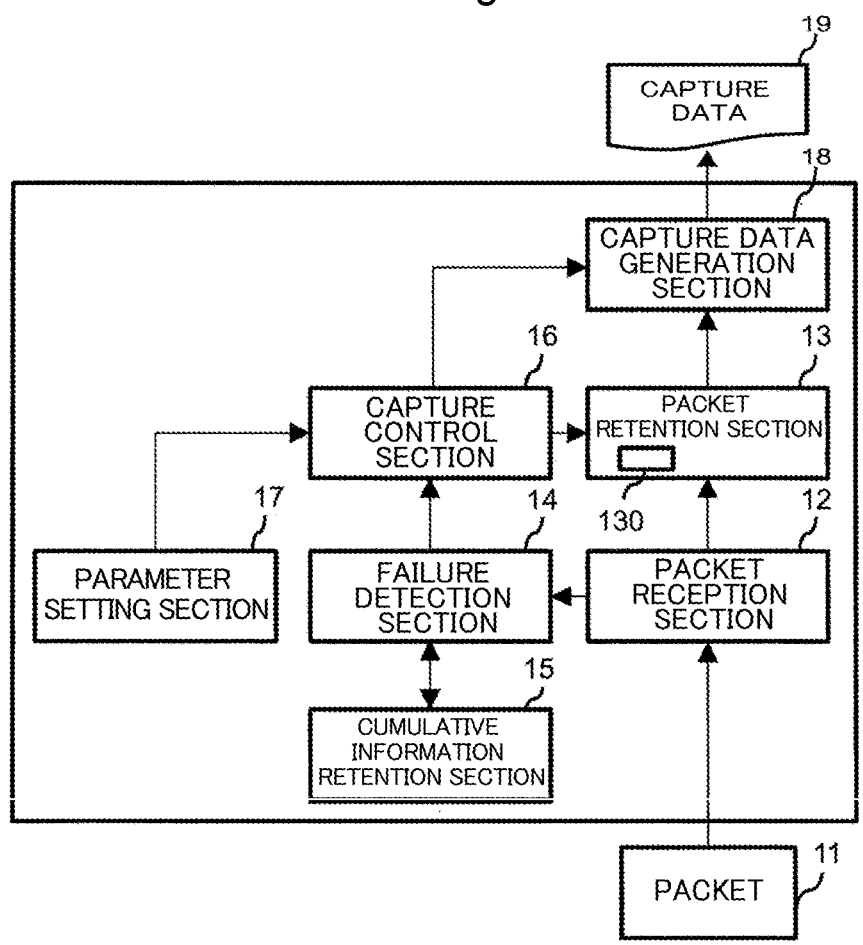
FIG. 2 is a block diagram showing a configuration of a packet capture device according to a first embodiment of the present invention.

Hereinbelow, a first embodiment of the present invention will be described in detail. FIG. 2 is a block diagram showing a configuration of a packet capture device according to the first embodiment of the present invention. The packet capture device is constituted by a packet reception section 12, a packet retention section 13, a failure detection section 14, a cumulative information retention section 15, a capture control section 16, a parameter setting section 17, and a capture data generation section 18. The packet reception section 12 receives a packet 11 from a connected network. The packet retention section 13 stores the received packet in a memory to temporarily retain the received packet. The failure detection section 14 determines whether or not communication failure is present in the network based on information of the received packet at predetermined time intervals. The cumulative information retention section 15 retains the cumulative number of packets and the cumulative number of bytes of the received packet. The capture control section 16 determines an operation stop address such that the retention of packets in time periods before and after the detection time point of the communication failure is ensured when the communication failure is detected by the failure detection section 14. The parameter setting section 17 sets various parameters. The capture data generation section 18 outputs the packet retained in the packet retention section 13 as capture data in, e.g., a PCAP format or the like in the form of a file.

Figures 3, 4:
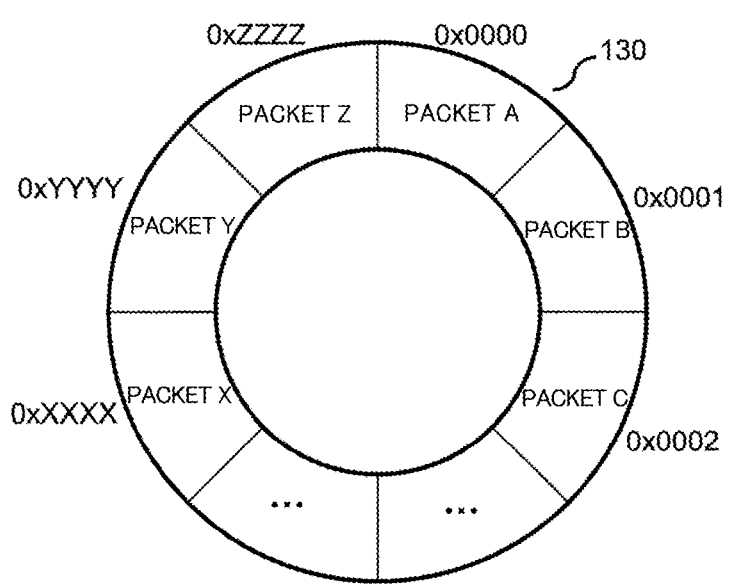
FIG. 3 is a view showing a physical structure of a packet storage memory according to the first embodiment of the present invention.
FIG. 4 is a view showing a logical structure of the packet storage memory according to the first embodiment of the present invention.

The packet retention section 13 has, inside the packet retention section 13, a packet storage memory 130 which functions as a ring buffer for temporarily retaining the received packet. A physical structure of the packet storage memory 130 is shown in FIG. 3. A logical structure in which the end and the head of the packet storage memory 130 shown in FIG. 3 are linked to each other is shown in FIG. 4.

Figure 5:
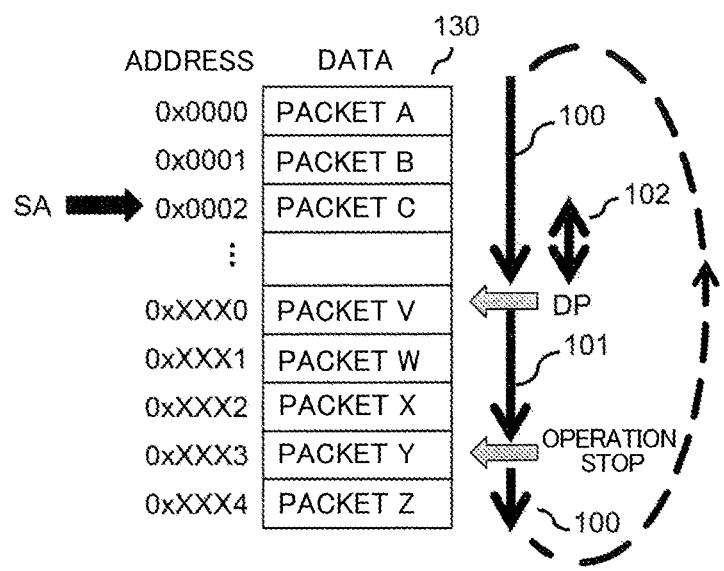
FIG. 5 is a view for explaining an example of a method for storing a packet in the packet storage memory according to the first embodiment of the present invention.
Figure 6:
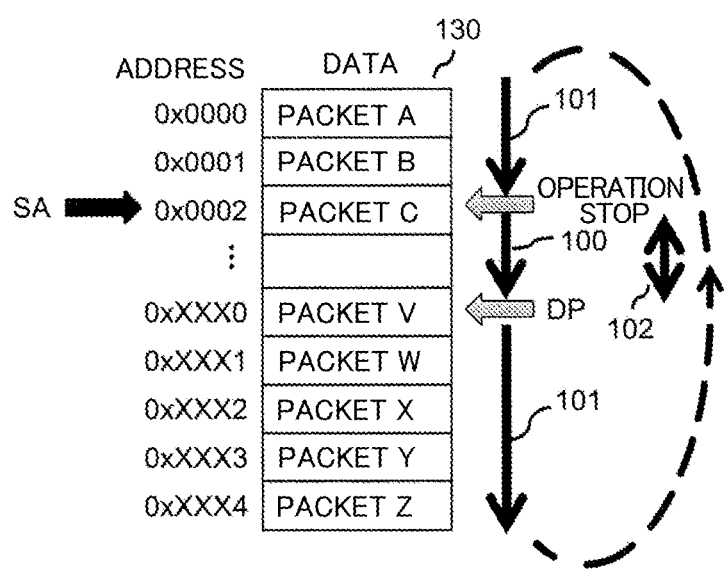
FIG. 6 is a view for explaining another example of the method for storing the packet in the packet storage memory according to the first embodiment of the present invention.

In addition, an outline of a method for storing a packet in the packet storage memory 130 is shown in FIG. 5 and FIG. 6. As described above, the packet storage memory 130 functions as the ring buffer. The packet retention section 13 stores packets sequentially from a top address of the packet storage memory 130 and, in the case where packets are stored up to a last address of the packet storage memory 130, the packet retention section 13 returns to the top address of the packet storage memory 130, and stores packets so as to overwrite stored data.

An operation of the packet retention section 13 is continued until the communication failure is detected. After the detection of the communication failure, the packet retention section 13 ends the operation in the case where one of the following two end conditions is satisfied. The first condition is a condition that a predetermined waiting time period of a seconds has elapsed from the detection time point DP of the communication failure. The second condition is a condition that a storage destination address of the packet storage memory 130 has reached an operation stop address SA described later. A method for determining the operation stop address SA will be described later.

FIG. 5 shows an example in which the operation is stopped due to the first condition. In this case, the waiting time period α has elapsed from the detection time point DP of the communication failure before the storage destination address of the packet storage memory 130 reaches the operation stop address SA, and hence the packet retention section 13 stops the operation at this time point (at a time point when an address is 0xXXX3).

FIG. 6 shows an example in which the operation is stopped due to the second condition. In the example in FIG. 6, the storage destination address of the packet storage memory 130 has reached the operation stop address SA (an address 0x0002) before the waiting time period α elapses from the detection time point DP of the communication failure, and hence the packet retention section 13 stops the operation at this time point.

Note that 100 in each of FIG. 5 and FIG. 6 denotes time periods before the detection time point DP of the communication failure, and 101 therein denotes time periods after the detection time point DP. In addition, 102 in each of FIG. 5 and FIG. 6 denotes, among the time periods before the detection time point DP of the communication failure, a capture ensuring time period in which the retention of the packet is ensured.

Figure 7:
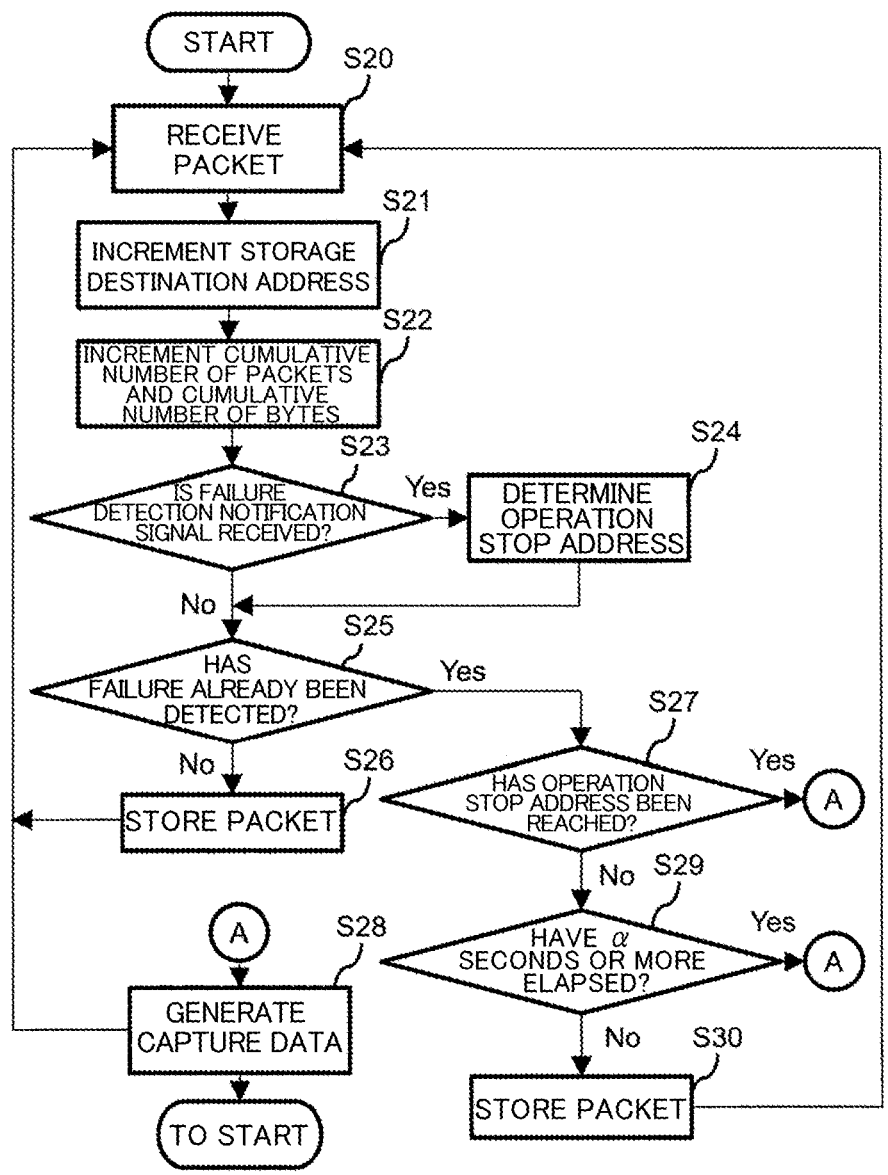
FIG. 7 is a flowchart for explaining an operation of the packet capture device according to the first embodiment of the present invention.
Figure 8:
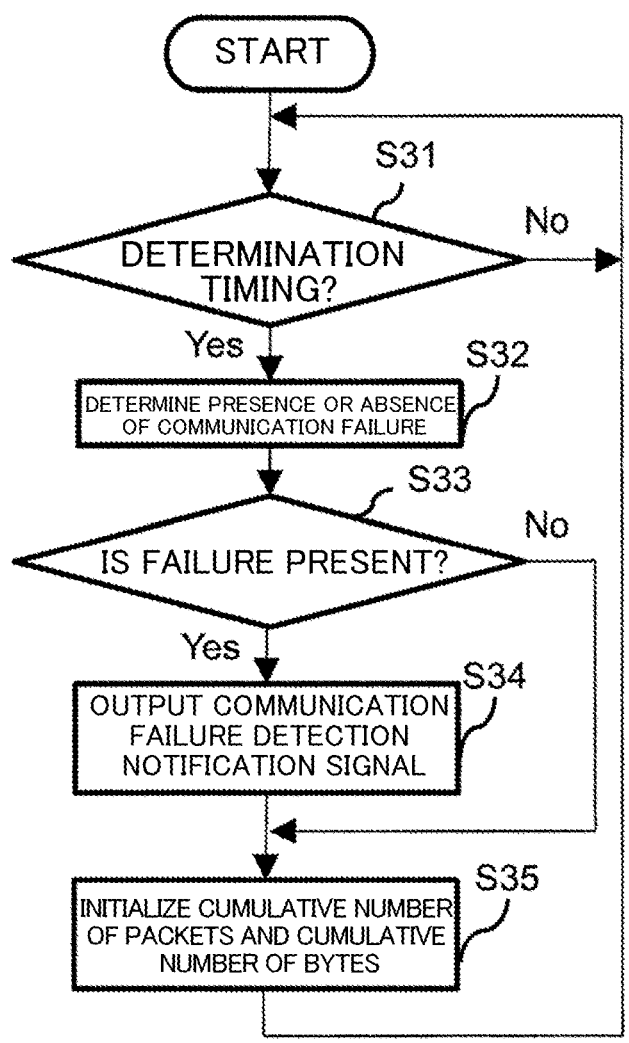
FIG. 8 is a flowchart for explaining an operation of a failure detection section of the packet capture device according to the first embodiment of the present invention.

Next, an operation of the packet capture device of the present embodiment will be described by using FIG. 7 and FIG. 8. FIG. 7 and FIG. 8 are used strictly for simply describing a control operation of the present embodiment, and are not intended to limit a control procedure and an implementation method embodiment of the present invention.

First, the packet reception section 12 receives the packet 11 from the network to which the packet capture device is connected (Step S20 in FIG. 7). Next, the packet retention section 13 increments the storage destination address of the packet of the packet storage memory 130 by 1 in response to the packet reception in the packet reception section 12 (Step S21 in FIG. 7).

The failure detection section 14 increments the cumulative number of packets retained in the cumulative information retention section 15 by 1, and increments the cumulative number of bytes retained in the cumulative information retention section 15 by the number of bytes of the received packet in response to the packet reception in the packet reception section 12 (Step S22 in FIG. 7).

In addition, the failure detection section 14 determines whether or not the communication failure is present in the network by comparing the cumulative number of packets retained in the cumulative information retention section 15 with a cumulative packet number upper limit threshold value PH at predetermined time intervals, or comparing the cumulative number of bytes retained in the cumulative information retention section 15 with a cumulative byte number upper limit threshold value BH at predetermined time intervals (Step S32 in FIG. 8).

A user can set any cumulative packet number upper limit threshold value PH and any cumulative byte number upper limit threshold value BH in the packet capture device. The cumulative packet number upper limit threshold value PH and the cumulative byte number upper limit threshold value BH input by the user are set by the parameter setting section 17.

In the case where the cumulative number of packets is more than the cumulative packet number upper limit threshold value PH, or in the case where the cumulative number of bytes is more than the cumulative byte number upper limit threshold value BH, the failure detection section 14 determines that the communication failure is present in the network (Yes in Step S33 in FIG. 8), and outputs a failure detection notification signal to the capture control section 16 (Step S34 in FIG. 8).

In the case where the cumulative number of packets is not more than the cumulative packet number upper limit threshold value PH and the cumulative number of bytes is not more than the cumulative byte number upper limit threshold value BH, and the failure detection section 14 determines that the communication failure is not present in the network (No in Step S33), or in the case where the failure detection section 14 has output the failure detection notification signal (Step S34), the cumulative number of packets and the cumulative number of bytes retained in the cumulative information retention section 15 are initialized to 0 (Step S35 in FIG. 8).

Note that the method for detecting the communication failure may also be a method other than the above-described method. For example, in the case where the cumulative number of packets retained in the cumulative information retention section 15 is less than a cumulative packet number lower limit threshold value PL, or in the case where the cumulative number of bytes retained in the cumulative information retention section 15 is less than a cumulative byte number lower limit threshold value BL, the failure detection section 14 may determine that the communication failure is present in the network (Step S33).

In the case where the cumulative packet number lower limit threshold value PL and the cumulative byte number lower limit threshold value BL are used, when the cumulative number of packets is not less than the cumulative packet number lower limit threshold value PL and is not more than the cumulative packet number upper limit threshold value PH and the cumulative number of bytes is not less than the cumulative byte number lower limit threshold value BL and is not more than the cumulative byte number upper limit threshold value BH, the failure detection section 14 determines that the communication failure is not present in the network.

The user can set any cumulative packet number lower limit threshold value PL and any cumulative byte number lower limit threshold value BL in the packet capture device. The cumulative packet number lower limit threshold value PL and the cumulative byte number lower limit threshold value BL input by the user are set by the parameter setting section 17. The failure detection section 14 performs the processing in Steps S32 to S35 described above at predetermined time intervals.

Next, the capture control section 16 determines whether or not the capture control section 16 has received the failure detection notification signal from the failure detection section 14 (Step S23 in FIG. 7). When the capture control section 16 has received the failure detection notification signal, the capture control section 16 determines the operation stop address SA (Step S24 in FIG. 7).

Specifically, the capture control section 16 sets, as the operation stop address SA, a value (PA−N) obtained by subtracting the number of addresses N corresponding to the preset capture ensuring time period from a storage destination address PA of the packet storage memory 130 at a time point when the capture control section 16 has received the failure detection notification signal.

At this point, in the case where the subtraction result (PA−N) obtained by subtracting the number of addresses N corresponding to the capture ensuring time period from the present storage destination address PA is negative (in the case where the subtraction result indicates an address value before the top address 0x0000 in FIGS. 5 and 6), the capture control section 16 sets, as the operation stop address SA, a value obtained by further subtracting the absolute value of the subtraction result (PA−N) from the last address (0xXXX4 in FIGS. 5 and 6) of the packet storage memory 130.

The user can set any length of the capture ensuring time period in the packet capture device. The capture ensuring time period (the number of addresses) input by the user is set by the parameter setting section 17. The capture ensuring time period may also be defined by using a ratio to the total memory capacity instead of using the number of addresses. Note that it goes without saying that the determination of the operation stop address SA is performed only once at a time point when the communication failure is detected.

Next, the capture control section 16 determines whether or not the communication failure has already been detected (Step S25 in FIG. 7). The capture control section 16 determines that the communication failure has already been detected when the capture control section 16 has already received the failure detection notification signal from the failure detection section 14, and determines that the communication failure is not yet detected when the capture control section 16 does not receive the failure detection notification signal.

In the case where the capture control section 16 determines that the communication failure is not yet detected, the packet retention section 13 stores the packet received by the packet reception section 12 in an area of the present storage destination address PA of the packet storage memory 130 (Step S26 in FIG. 7), and returns to Step S20.

In addition, in the case where the capture control section 16 determines that the communication failure has already been detected, the capture control section 16 determines whether or not the present storage destination address PA of the packet storage memory 130 has reached the operation stop address SA (Step S27 in FIG. 7).

In the case where it is determined that the storage destination address PA has reached the operation stop address SA (PA=SA), the capture data generation section 18 uses the operation stop address SA of the packet storage memory 130 as an output start address, converts packets stored in an area from the output start address to (PA−1) to a file in, e.g., a PCAP format according to the order of arrangement from SA to (PA−1), and outputs the file in the PCAP format as capture data 19 (Step S28 in FIG. 7). After the output of the capture data 19, the packet capture device returns to Step S20.

In addition, in the case where the present storage destination address PA of the packet storage memory 130 does not reach the operation stop address SA (PA≠SA), the capture control section 16 determines whether or not the waiting time period α or more has elapsed from a time point when the capture control section 16 has received the failure detection notification signal (the detection time point DP of the communication failure) (Step S29 in FIG. 7).

The user can set any waiting time period α in the packet capture device. The value of the waiting time period α input by the user is set by the parameter setting section 17. Note that the sum of the number of addresses corresponding to the waiting time period α and the number of addresses corresponding to the capture ensuring time period needs to be not more than the number of addresses from the top address of the packet storage memory 130 to the last address thereof.

In the case where it is determined that the waiting time period α or more has elapsed from the detection time point DP of the communication failure, the capture data generation section 18 uses the operation stop address SA of the packet storage memory 130 as the output start address, converts packets stored in the area from the output start address to (PA−1) to a file in the PCAP format according to the order of arrangement from SA to (PA−1), and outputs the file in the PCAP format as the capture data 19 (Step S28).

In the case where an elapsed time period from the detection time point DP of the communication failure is less than the waiting time period α, the packet retention section 13 stores the packet received by the packet reception section 12 in the area of the present storage destination address PA of the packet storage memory 130 (Step S29 in FIG. 7), and returns to Step S20.

Thus, in the present embodiment, it is possible to ensure the collection of the packets in the time periods before and after the failure occurrence with a minimum memory configuration.

Second Embodiment

Next, a second embodiment of the present invention will be described in detail. In the present embodiment, the failure is detected for each flow of traffic. Herein, the flow denotes a group of packets defined by a combination of field information of a packet header such as a source IP address and a destination IP address. The failure determination is performed on the entire traffic in the first embodiment. However, in the present embodiment, after the flow is identified by analyzing a header of a received packet, it is determined whether or not the failure is present for each flow.

Figure 9:
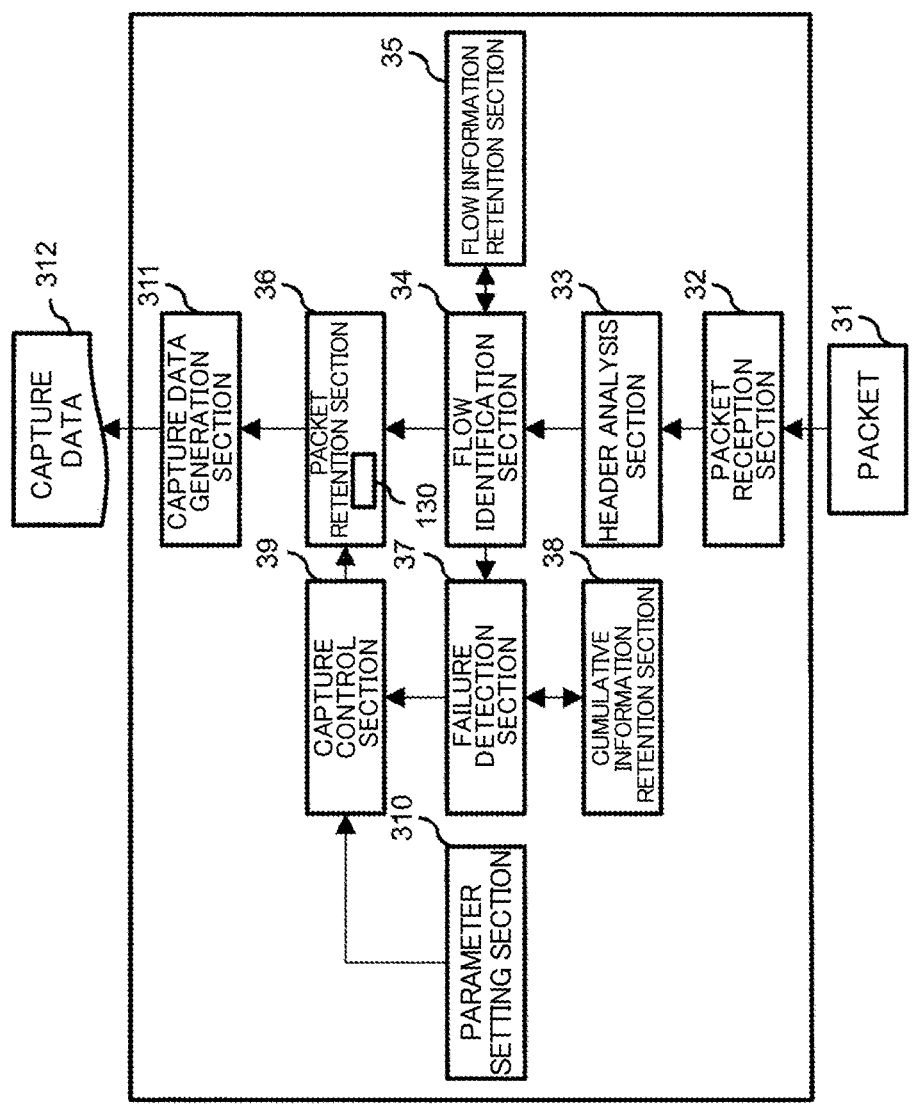
FIG. 9 is a block diagram showing a configuration of a packet capture device according to a second embodiment of the present invention.

FIG. 9 is a block diagram showing a configuration of a packet capture device according to the present embodiment. The packet capture device of the present embodiment is constituted by a packet reception section 32, a header analysis section 33, a flow identification section 34, a flow information retention section 35, a flow information retention section 36, a failure detection section 37, a cumulative information retention section 38, a capture control section 39, a parameter setting section 310, and a capture data generation section 311. The packet reception section 32 receives a packet 31 from a connected network. The header analysis section 33 extracts a header of the received packet. The flow identification section 34 identifies a flow to which the packet belongs based on information of the header extracted by the header analysis section 33. The flow information retention section 35 retains flow information. The packet retention section 36 stores the received packet in a memory to temporarily retain the received packet. The failure detection section 37 determines whether or not the communication failure is present in the network based on information of the received packet determined on a flow-by-flow basis at predetermined time intervals. The cumulative information retention section 38 retains the cumulative number of packets and the cumulative number of bytes of each flow. The capture control section 39 determines the operation stop address such that the retention of the packets in the time periods before and after the detection time point of the communication failure is ensured when the communication failure is detected by the failure detection section 37. The parameter setting section 310 sets various parameters. The capture data generation section 311 outputs the packet retained in the packet retention section 36 as capture data in, e.g., the PCAP format or the like in the form of a file.

The detail of the flow information retained in the flow information retention section 35 is shown in FIG. 10. As shown in FIG. 10, in the flow information, a flow ID serving as a unique identification number assigned to each flow, a source Media Access Control (MAC) address, a destination MAC address, a source IP address, and a destination IP address are recorded for each flow.

Note that the flow information retained in the flow information retention section 35 may also be information other than the flow information shown in FIG. 10. Unlike the example shown in FIG. 10, pieces of header field information such as, e.g., a source port number, a destination port number, a protocol type, a Virtual Local Area Network (VLAN) Identifier (ID), and a Virtual eXtensible Local Area Network (VXLAN) Identifier (ID) may also be used as the flow information.

The detail of the cumulative information retained in the cumulative information retention section 38 is shown in FIG. 11. Similarly to the cumulative information retention section 15 in the first embodiment, the cumulative information retention section 38 retains the cumulative number of packets and the cumulative number of bytes, and also retains the cumulative number of packets and the cumulative number of bytes which are determined on a flow-by-flow basis in addition to the cumulative number of packets and the cumulative number of bytes of entire received traffic. Similarly to the packet retention section 13 in the first embodiment, the packet retention section 36 has the packet storage memory 130 inside the packet retention section 36.

Figure 13:
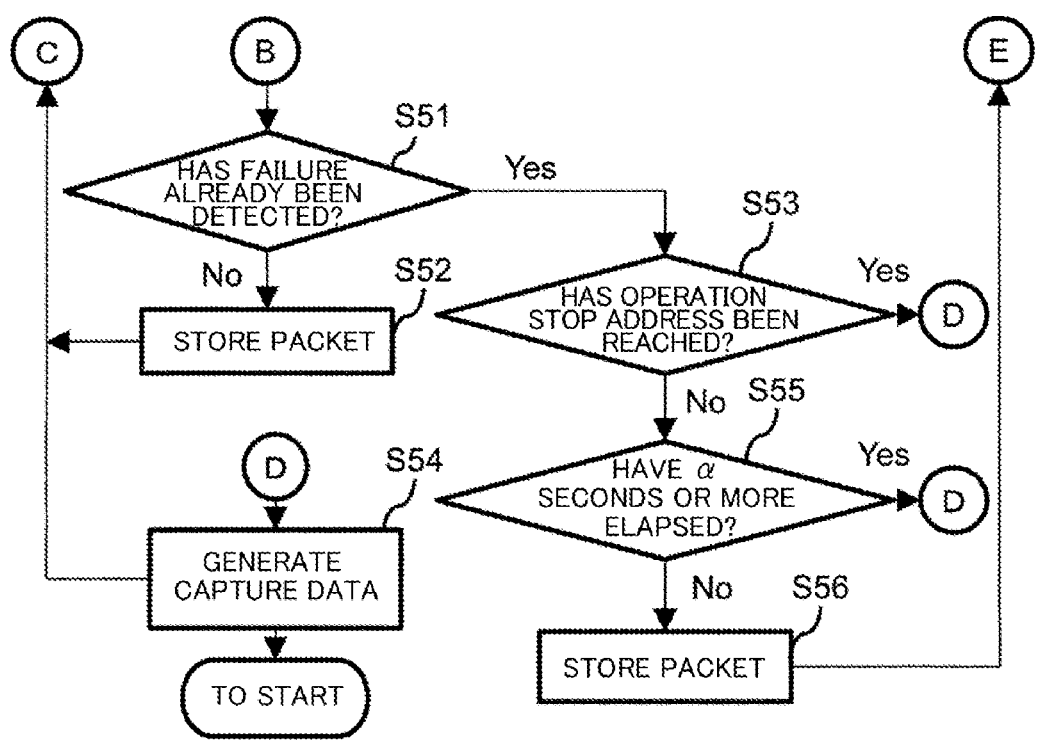
FIG. 13 is a flowchart for explaining the operation of the packet capture device according to the second embodiment of the present invention.
Figure 14:
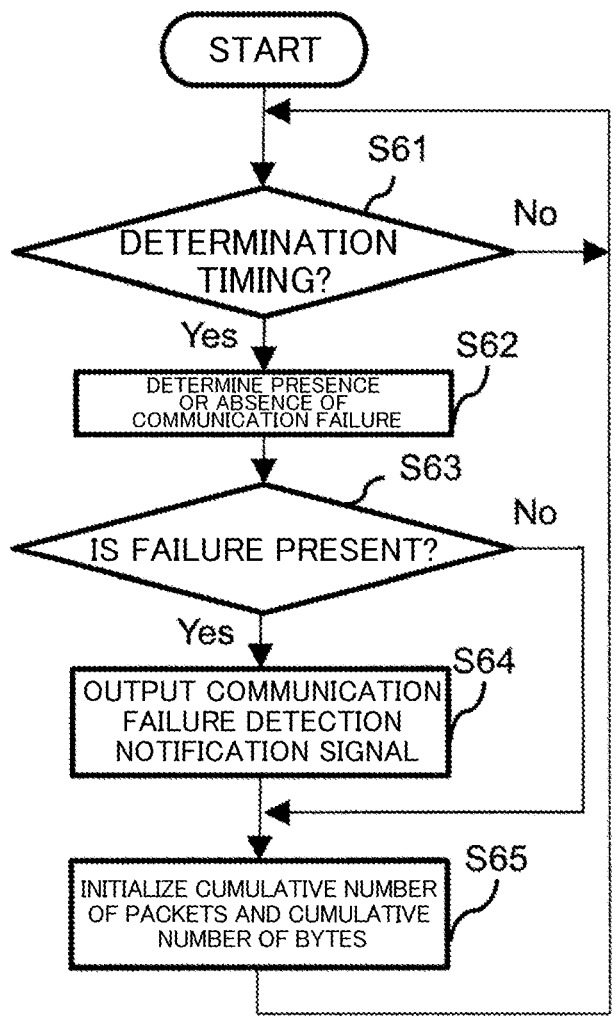
FIG. 14 is a flowchart for explaining an operation of a failure detection section of the packet capture device according to the second embodiment of the present invention.

Next, an operation of the packet capture device of the present embodiment will be described by using FIGS. 12 to 14. Note that FIGS. 12 to 14 are used strictly for simply describing a control operation of the present embodiment, and are not intended to limit a control procedure and an implementation method embodiment of the present invention.

Figure 12:
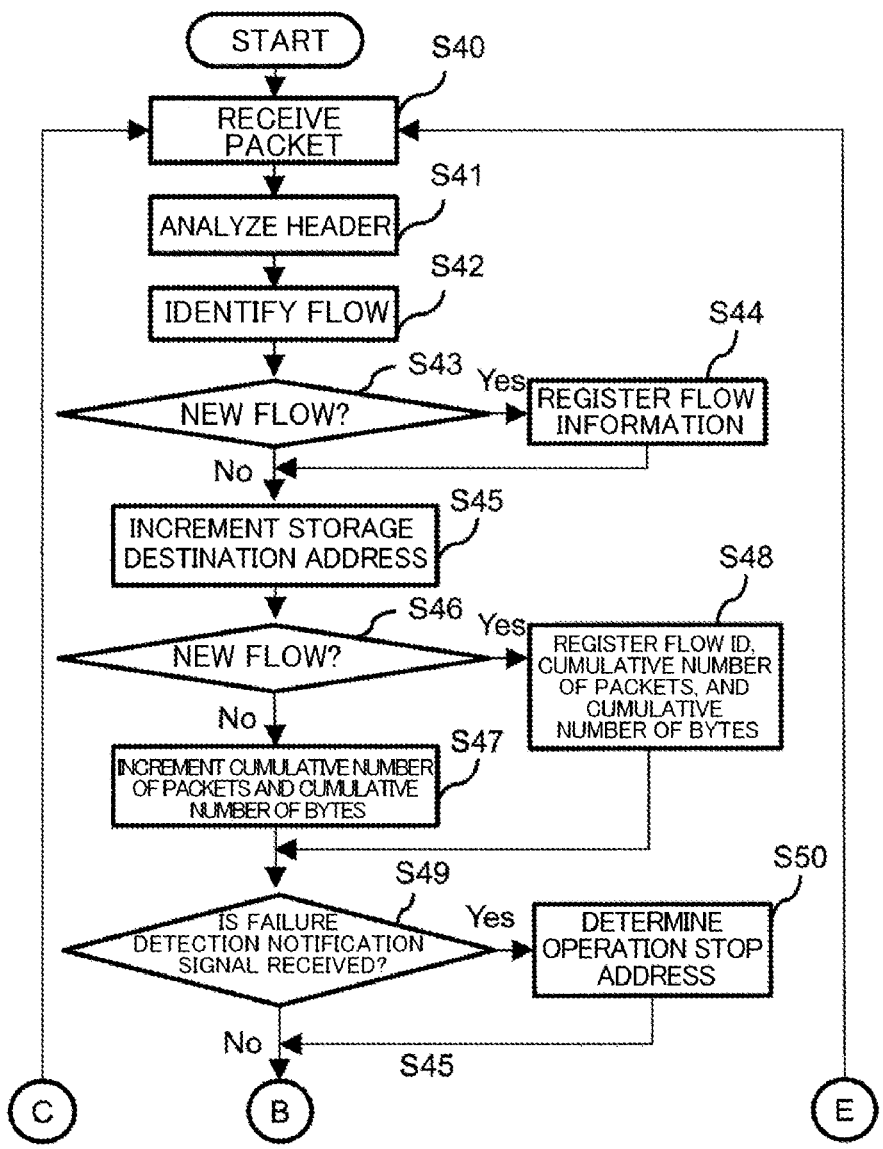
FIG. 12 is a flowchart for explaining an operation of the packet capture device according to the second embodiment of the present invention.

First, the packet reception section 32 receives the packet 31 from the network to which the packet capture device is connected (Step S40 in FIG. 12). Next, the header analysis section 33 analyzes the header of the packet received by the packet reception section 12, and extracts the field information of the header (Step S41 in FIG. 12).

The flow identification section 34 identifies a flow to which the packet received by the packet reception section 12 belongs based on the field information of the header extracted by the header analysis section 33 (Step S42 in FIG. 12). Specifically, the flow identification section 34 performs a search to determine whether or not information on the flow to which the received packet belongs is already registered in the flow information retention section 35 and, in the case where the information on the corresponding flow is registered, the flow identification section 34 acquires an ID of the flow from the flow information retention section 35.

For example, in an example in FIG. 10, when the source MAC address, the destination MAC address, the source IP address, and the destination IP address of the received packet match the information on the flow registered in the flow information retention section 35, the flow identification section 34 determines that the received packet belongs to the registered flow, and acquires the ID of the flow.

In addition, in the case where the information on the flow to which the received packet belongs is not registered in the flow information retention section 35, i.e., in the case where the information on the flow which matches the source MAC address, the destination MAC address, the source IP address, and the destination IP address of the received packet is not registered in the flow information retention section 35, the flow identification section 34 determines that the received packet belongs to a new flow.

In the case where the flow identification section 34 determines that the received packet belongs to the new flow (Yes in Step S43 in FIG. 12), the flow identification section 34 determines the ID assigned to the new flow, and registers the determined ID, and the source MAC address, the destination MAC address, the source IP address, and the destination IP address of the received packet in the flow information retention section 35 as information on the new flow (Step S44 in FIG. 12).

The packet retention section 36 increments the storage destination address of the packet of the packet storage memory 130 by 1 after the identification of the flow by the flow identification section 34 (Step S45 in FIG. 12). Next, the flow identification section 34 notifies the failure detection section 37 of the ID of the flow to which the received packet belongs and the number of bytes of the received packet.

The failure detection section 37 performs a search to determine whether or not the flow ID of which the failure detection section 37 is notified by the flow identification section 34 is registered in the cumulative information retention section 38 and, in the case where the corresponding flow ID is registered (No in Step S46 in FIG. 12), the failure detection section 37 increments the cumulative number of packets of the corresponding flow ID retained in the cumulative information retention section 38 by 1, and increments the cumulative number of bytes of the corresponding flow ID retained in the cumulative information retention section 38 by the number of bytes of the received packet of which the failure detection section 37 is notified by the flow identification section 34 (Step S47 in FIG. 12).

Further, the failure detection section 37 increments the cumulative number of packets of the entire traffic retained in the cumulative information retention section 38 by 1, and increments the cumulative number of bytes of the entire traffic retained in the cumulative information retention section 38 by the number of bytes of the received packet of which the failure detection section 37 is notified by the flow identification section 34 (Step S47).

In addition, in the case where the flow ID of which the failure detection section 37 is notified by the flow identification section 34 is not registered in the cumulative information retention section 38 (Yes in Step S46), the failure detection section 37 determines that the received packet belongs to a new flow, sets the cumulative number of packets of the flow to 1, and sets the cumulative number of bytes of the flow to the number of bytes equal to the number of bytes of the received packet of which the failure detection section 37 is notified by the flow identification section 34. Subsequently, the failure detection section 37 newly registers the cumulative number of packets and the cumulative number of bytes in the cumulative information retention section 38 in association with the flow ID of which the failure detection section 37 is notified by the flow identification section 34 (Step S48 in FIG. 12).

Further, the failure detection section 37 increments the cumulative number of packets of the entire traffic retained in the cumulative information retention section 38 by 1, and increments the cumulative number of bytes of the entire traffic retained in the cumulative information retention section 38 by the number of bytes of the received packet of which the failure detection section 37 is notified by the flow identification section 34 (Step S48).

The failure detection section 37 determines whether or not the communication failure is present in the network by comparing the cumulative number of packets of each flow retained in the cumulative information retention section 38 with a cumulative packet number upper limit threshold value FPH at predetermined time intervals, or comparing the cumulative number of bytes of each flow retained in the cumulative information retention section 38 with a cumulative byte number upper limit threshold value FBH at predetermined time intervals (Step S62 in FIG. 14).

The user can set the cumulative packet number upper limit threshold value FPH determined on a flow-by-flow basis and the cumulative byte number upper limit threshold value FBH determined on a flow-by-flow basis in the packet capture device. The cumulative packet number upper limit threshold value FPH and the cumulative byte number upper limit threshold value FBH input by the user are set by the parameter setting section 310.

In the case where, among the cumulative numbers of packets of the individual flows, the cumulative number of packets of at least one of the flows is more than the cumulative packet number upper limit threshold value FPH, or in the case where, among the cumulative numbers of bytes of the individual flows, the cumulative number of bytes of at least one of the flows is more than the cumulative byte number upper limit threshold value FBH, the failure detection section 37 determines that the communication failure is present in the network (Yes in Step S63 in FIG. 14), and outputs the failure detection notification signal to the capture control section 39 (Step S64 in FIG. 14).

Subsequently, in the case where all of the cumulative numbers of packets of the individual flows are not more than the cumulative packet number upper limit threshold value FPH and all of the cumulative numbers of bytes of the individual flows are not more than the cumulative byte number upper limit threshold value FBH, and the failure detection section 37 determines that the communication failure is not present in the network (No in Step S63), or in the case where the failure detection section 37 has output the failure detection notification signal (Step S64), all of the cumulative numbers of packets and all of the cumulative numbers of bytes which are retained in the cumulative information retention section 38 are initialized to 0 (Step S65 in FIG. 14).

Note that the method for detecting the communication failure may also be a method other than the above-described method. For example, in the case where, among the cumulative numbers of packets of the individual flows retained in the cumulative information retention section 38, the cumulative number of packets of at least one of the flows is less than a cumulative packet number lower limit threshold value FPL, or in the case where, among the cumulative numbers of bytes of the individual flows retained in the cumulative information retention section 38, the cumulative number of bytes of at least one of the flows is less than a cumulative byte number lower limit threshold value FBL, the failure detection section 37 may determine that the communication failure is present in the network (Step S63).

In the case where the cumulative packet number lower limit threshold value FPL and the cumulative byte number lower limit threshold value FBL are used, when the cumulative number of packets of each flow is not less than the cumulative packet number lower limit threshold value FPL and not more than the cumulative packet number upper limit threshold value FPH, and the cumulative number of bytes of each flow is not less than the cumulative byte number lower limit threshold value FBL and not more than the cumulative byte number upper limit threshold value FBH, the failure detection section 37 determines that the communication failure is not present in the network.

The user can set the cumulative packet number lower limit threshold value FPL determined on a flow-by-flow basis and the cumulative byte number lower limit threshold value FBL determined on a flow-by-flow basis in the packet capture device. The cumulative packet number lower limit threshold value FPL and the cumulative byte number lower limit threshold value FBL input by the user are set by the parameter setting section 310. The failure detection section 37 performs the processing in Steps S62 to S65 described above at predetermined time intervals.

Next, the capture control section 39 determines whether or not the capture control section 39 has received the failure detection notification signal from the failure detection section 37 (Step S49 in FIG. 12). When the capture control section 39 has received the failure detection notification signal, the capture control section 39 determines the operation stop address SA (Step S5o in FIG. 12). The method for determining the operation stop address SA is the same as that in the first embodiment. Similarly to the first embodiment, the capture ensuring time period (the number of addresses) is set in advance by the parameter setting section 310.

Next, the capture control section 39 determines whether or not the communication failure has already been detected (Step S51 in FIG. 13). The capture control section 39 determines that the communication failure has already been detected when the capture control section 39 has already received the failure detection notification signal from the failure detection section 37, and determines that the communication failure is not yet detected when the capture control section 39 does not receive the failure detection notification signal.

In the case where the capture control section 39 determines that the communication failure is not yet detected, the packet retention section 36 stores the packet received by the packet reception section 32 in the area of the present storage destination address PA of the packet storage memory 130 (Step S52 in FIG. 13), and returns to Step S40.

In addition, in the case where the capture control section 39 determines that the communication failure has already been detected, the capture control section 39 determines whether or not the present storage destination address PA of the packet storage memory 130 has reached the operation stop address SA (Step S53 in FIG. 13).

In the case where it is determined that the storage destination address PA has reached the operation stop address SA, the capture data generation section 311 uses the operation stop address SA of the packet storage memory 130 as the output start address, converts packets stored in the area from the output start address to (PA−1) to a file in, e.g., the PCAP format according to the order of arrangement from SA to (PA−1), and outputs the file in the PCAP format as capture data 312 (Step S54 in FIG. 13). After the output of the capture data 312, the packet capture device returns to Step S40.

In addition, in the case where the present storage destination address PA of the packet storage memory 130 does not reach the operation stop address SA, the capture control section 39 determines whether or not the waiting time period α or more has elapsed from the time point when the capture control section 39 has received the failure detection notification signal (the detection time point DP of the communication failure) (Step S55 in FIG. 13). Similarly to the first embodiment, the waiting time period α is set in advance by the parameter setting section 310.

In the case where it is determined that the waiting time period α or more has elapsed from the detection time point DP of the communication failure, the capture data generation section 311 uses the operation stop address SA of the packet storage memory 130 as the output start address, converts packets stored in the area from the output start address to (PA−1) to a file in, e.g., the PCAP format according to the order of arrangement from SA to (PA−1), and outputs the file in the PCAP format as the capture data 19 (Step S54).

In the case where the elapsed time period from the detection time point DP of the communication failure is less than the waiting time period α, the packet retention section 36 stores the packet received by the packet reception section 32 in the area of the present storage destination address PA of the packet storage memory 130 (Step S56 in FIG. 13), and returns to Step S40. Thus, in the present embodiment, it is possible to detect the communication failure for each flow.

Figure 15:
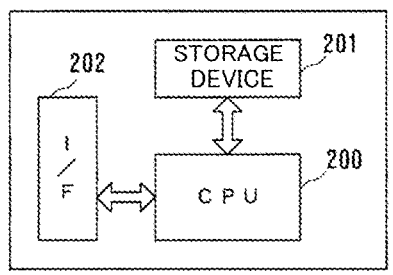
FIG. 15 is a block diagram showing an example of a configuration of a computer which implements the packet capture device according to each of the first and second embodiments of the present invention.

The packet capture device described in each of the first and second embodiments can be implemented by a computer including a Central Processing Unit (CPU), a storage device, and an interface, and a program for controlling these hardware resources. An example of a configuration of the computer is shown in FIG. 15.

The computer includes a CPU 200, a storage device 201, and an interface device (I/F) 202. To the I/F 202, circuits of the packet reception sections 12 and 32 and a device serving as an output destination of the capture data are connected. In such a computer, a program for implementing a packet capture method embodiment of the present invention is stored in the storage device 201. The CPU 200 executes the processing described in each of the first and second embodiments according to the program stored in the storage device 201. In addition, part of the packet capture device described in each of the first and second embodiments may be constituted by hardware logic such as an application specific integrated circuit (ASIC) or a field-programmable gate array (FPGA).

INDUSTRIAL APPLICABILITY

Embodiments of the present invention can be applied to a technique for analyzing causes of communication failure such as burst traffic in an IP network.

REFERENCE SIGNS LIST 11, 31 Packet
12, 32 Packet reception section
13, 36 Packet retention section
14, 37 Failure detection section
15, 38 Cumulative information retention section
16, 39 Capture control section
17, 310 Parameter setting section
18, 311 Capture data generation section
19, 312 Capture data
33 Header analysis section
34 Flow identification section
35 Flow information retention section
130 Packet storage memory

The invention claimed is:

1. A packet capture device comprising:
a packet receiver configured to receive a packet from a network;
a packet retainer configured to store the received packet in a memory to temporarily retain the received packet;
a failure detector configured to determine a communication failure is present in the network based on information of the received packet;
a capture controller configured to determine an operation stop address such that retention of packets from the network in time periods before and after a detection time point of the communication failure is ensured when the communication failure is determined present by the failure detector, wherein the capture controller is further configured to determine the operation stop address based on a storage destination address of the packet at the detection time point of the communication failure and a length of a preset ensuring time period in which retention of the packet before detection of the communication failure is ensured; and
a capture data generator configured to output the packet stored in the memory as capture data when the storage destination address of the packet stored in the memory has reached the operation stop address or when at least a predetermined waiting time period has elapsed from the detection time point of the communication failure.

2. The packet capture device of claim 1, wherein the packet retainer comprises the memory, the memory having a ring buffer configuration, the packet retainer further configured to store the packet received by the packet receiver in an area of the storage destination address of the memory, and to update the storage destination address when the communication failure is not yet detected or when the storage destination address does not reach the operation stop address and an elapsed time period from the detection time point of the communication failure is less than the predetermined waiting time period when the packet is received by the packet receiver.

3. The packet capture device of claim 1 wherein the failure detector is further configured to determine that the communication failure is present in the network when a cumulative number of packets of the packet received by the packet receiver per predetermined time interval is more than a cumulative packet number upper limit threshold value, or when a cumulative number of bytes of the packet received by the packet receiver per predetermined time interval is more than a cumulative byte number upper limit threshold value.

4. The packet capture device of claim 1, further comprising:
a flow identifier configured to identify a flow to which the packet received by the packet receiver belongs; and
a cumulative information retainer configured to retain a cumulative number of packets of the packet received by the packet receiver and a cumulative number of bytes of the packet received by the packet receiver for each flow, wherein the failure detector is configured to determine that the communication failure is present in the network when a cumulative number of packets of each flow per predetermined time interval is more than a cumulative packet number upper limit threshold value, or when a cumulative number of bytes of each flow per predetermined time interval is more than a cumulative byte number upper limit threshold value.

5. The packet capture device of claim 1, wherein the capture data generator is configured to use the operation stop address as a start address, and to output the packet stored in an area of the memory to an address obtained by subtracting 1 from the storage destination address as the capture data.

6. The packet capture device of claim 1, further comprising a parameter setter configured to set the predetermined waiting time period.

7. A packet capture method comprising:
receiving a packet from a network;
determining a communication failure is present in the network based on information of the received packet;
determining an operation stop address such that retention of packets from the network in time periods before and after a detection time point of the communication failure is ensured in response to the communication failure being determined present, wherein the operation stop address is determined based on a storage destination address of the packet at the detection time point of the communication failure and a length of a preset ensuring time period in which retention of the packet before detection of the communication failure is ensured;

storing the received packet in a memory to temporarily retain the received packet; and outputting the packet stored in the memory as capture data in response to the storage destination address of the packet stored in the memory having reached the operation stop address or in response to at least a predetermined waiting time period having elapsed from the detection time point of the communication failure.

8. The packet capture method of claim 7, wherein the memory has a ring buffer configuration, the method further comprising:

storing the received packet in an area of the storage destination address of the memory; and updating the storage destination address in response to the communication failure being not yet detected or in response to the storage destination address not reaching the operation stop address and an elapsed time period from the detection time point of the communication failure is less than the predetermined waiting time period in response to the packet being received.

9. The packet capture method of claim 7, wherein the communication failure is determined to be present in the network in response to a cumulative number of packets of the received packet per predetermined time interval being more than a cumulative packet number upper limit threshold value, or in response to a cumulative number of bytes of the received packet per predetermined time interval being more than a cumulative byte number upper limit threshold value.

10. The packet capture method of claim 7, further comprising:

identifying a flow to which the received packet belongs; and retaining a cumulative number of packets of the packet and a cumulative number of bytes of the packet for each flow, wherein the communication failure is determined to be present in the network in response to a cumulative number of packets of each flow per predetermined time interval being more than a cumulative packet number upper limit threshold value, or in response to a cumulative number of bytes of each flow per predetermined time interval being more than a cumulative byte number upper limit threshold value.

11. The packet capture method of claim 7 further comprising:

using the operation stop address as a start address; and outputting the packet stored in an area of the memory to an address obtained by subtracting 1 from the storage destination address as the capture data.

12. The packet capture method of claim 7 further comprising:

setting the predetermined waiting time period.

* * * * *